(12) United States Patent
Venkataraman

(10) Patent No.: US 10,938,777 B2
(45) Date of Patent: Mar. 2, 2021

(54) COMPUTER IMPLEMENTED SYSTEM AND METHOD FOR SNOOPING PCP PACKETS

(71) Applicant: COLORTOKENS, INC., Santa Clara, CA (US)

(72) Inventor: Natarajan Venkataraman, Bangalore (IN)

(73) Assignee: COLORTOKENS, INC., Santa Clara, CA (US)

(*) Notice: Subject to any disclaimer, the term of this patent is extended or adjusted under 35 U.S.C. 154(b) by 111 days.

(21) Appl. No.: 16/155,851

(22) Filed: Oct. 9, 2018

(65) Prior Publication Data

US 2020/0112540 A1    Apr. 9, 2020

(51) Int. Cl.
*H04L 29/12*   (2006.01)
*H04L 12/823*   (2013.01)
*H04L 29/06*   (2006.01)

(52) U.S. Cl.
CPC .......... *H04L 61/2557* (2013.01); *H04L 47/32* (2013.01); *H04L 61/2007* (2013.01); *H04L 61/256* (2013.01); *H04L 63/02* (2013.01)

(58) Field of Classification Search
CPC ..... H04L 63/02; H04L 47/32; H04L 61/2007; H04L 61/256; H04L 61/2557
See application file for complete search history.

(56) References Cited

U.S. PATENT DOCUMENTS

2013/0227170 A1* 8/2013 Zha ............... H04L 61/2514
                                                        709/245
2017/0063927 A1* 3/2017 Schultz ............... H04L 63/20

OTHER PUBLICATIONS

M. Boucadair, Aug. 19, 2013. "Port Control Protocol (PCP) Failure Scenarios". Retrieved on Apr. 26, 2020, retrieved from <https://datatracker.ietf.org/meeting/86/agenda/pcp-drafts.pdf> (Year: 2013).*

* cited by examiner

*Primary Examiner* — Shean Tokuta
*Assistant Examiner* — Juan C Turriate Gastulo
(74) *Attorney, Agent, or Firm* — Barry Choobin; Patent 360LLC

(57) ABSTRACT

Whenever an IP packet is routed from a source computing device through to a NAT device on the way to a destination computing device, a PCP client transmits a PCP query to a PCP server to determine the external IP address and external port number that have been substituted for the source IP address and source port number previously incorporated within the IP packet. Subsequently, the PCP server responds to the PCP client with the information denoting the mapping between the source IP address-some port number pair and the external IP address-external port number pair. A snooping agent is utilized to firstly snoop on the mapping communicated from the PCP server to the PCP client, and secondly to communicate the mapping information to a policy server incorporating a plurality of predefined firewall rules usable in deducing appropriate PACKET ALLOW/PACKET DROP decisions, based on the mapping information.

7 Claims, 2 Drawing Sheets

COMPUTER IMPLEMENTED SYSTEM AND METHOD FOR SNOOPING PCP PACKETS

DEFINITION OF TERMS USED IN THE PRESENT DISCLOSURE

Figure 1:
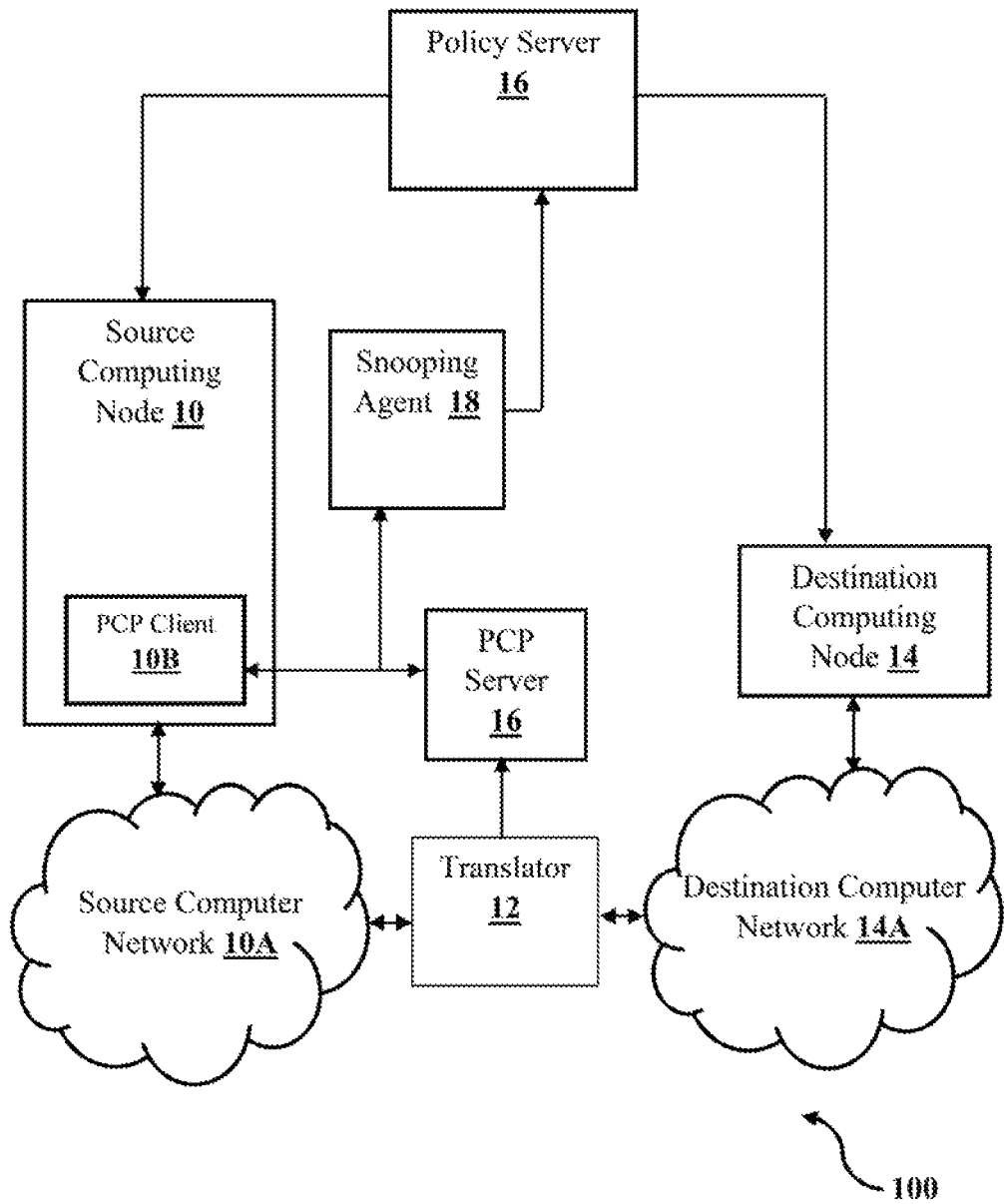

The term 'NAT mapping information' as used in the present disclosure denotes a mapping between a source IP address—source port number pair, and a translated IP address—translated port number pair. The NAT mapping information also denotes a translation of the source IP address and source port number address into the translated IP address and the translated port number respectively.

The term 'source IP address-source port number pair' refers to the source IP address and source port number in combination. Likewise, the term 'external IP address-external port number pair' refers to the external IP address and external port number in combination.

BACKGROUND

Technical Field

The present disclosure relates to the field of network data processing. Particularly, the present disclosure relates to systems, methods and computer program products that facilitate fetching and subsequent analysis of Network Address Translation (NAT) mapping information. More particularly, the present disclosure relates to systems, methods and computer program products that are programmed to create fine-grained network security policies based on the (fetched) NAT mapping information.

Background

To address the ever-increasing need to seamlessly connect geographically displaced end-user terminals the Transport Control Protocol/Internet Protocol (TCP/IP) suite was introduced. Widespread use of computer and the recent advancements in the field of computer networks and network communication have enhanced the use of TCP/IP protocol suite in many of today's internetworks. The TCP/IP protocol suite enables geographically dispersed computer devices to connect and communicate with one another by the way of exchanging IP datagrams. Typically, Network Address Translation (NAT) devices such as routers and gateways governed inter-alia by the TCP/IP protocol suite facilitate routing of IP datagrams between the nodes or hosts, by establishing a data path therebetween.

Typically, any NAT device, for instance a gateway, is used to enable users and in turn computers used by the users to access remotely located target computer systems (for example, a mail server located on a computer network). A gateway typically provides connectivity between various computer systems irrespective of the fact that they are located remotely and distantly from one another. Typically, a gateway receives a packet on one port from a source computing node and forwards the received packet on another port to a destination computing node. While forwarding the received packet to the destination computing node, the gateway simultaneously performs a 'look-up' operation to determine a specific interface (TCP/UDP port) to be used for forwarding the received packet. Typically, the phenomenon of forwarding a received packet requires the packet to traverse through a plurality of gateways before eventually reaching the destination computing node.

Further, preferably, gateways are also configured to perform the task of Network Address Translation (NAT) which involves, as the name suggests, a substitution of the original address (referred to as source IP address hereafter) embedded in the received packet with a new IP address (translated IP address or External IP address) unique to the destination computer network. Preferably, the port number (referred to as source port number hereafter) embedded in the packet received by the gateway (received packet) is also replaced by a new port number (translated port number or External port number). Preferably, the NAT device's IP address and NAT device's port number are an external IP address and external port number (respectively) which are bound (mapped) by the gateways, at least in a semi-permanent manner, to respective source IP addresses and source port numbers.

Taking into consideration an exemplary packet based communication scenario involving at least two participants, i.e. the source computing node and the destination computing node, it is pertinent to note that the local address (for instance. 'address-S') assigned to the source computing node is translated into an external address (for instance 'address-E'). Preferably, a gateway configured to facilitate communication between the source computing node and the destination computing node by the way of exchange of IP datagrams therebetween, maintains NAT information indicating that the source IP address 'address-S' needs to be translated (External) into external IP address 'address-E' in the upstream direction, i.e., when IP datagrams are transmitted from the source computing node to the destination computing node. Similarly, the gateway would also translate the external IP address 'address-E' into source IP address 'address-S' when the flow of IP datagrams is in a downstream direction, i.e., from the destination computing node to the source computing node. Additionally, the gateway also determines the specific port on which the IP datagrams are to be transmitted. Preferably, in the upstream direction the port to be used for transmission depends on the IP address of the destination computing node, while in the downstream direction, the transmission port is determined preferably based on the local IP address (source IP address; 'address-S') or the external IP address ('address-E') assigned to the source computing node.

It is evident from the foregoing that the gateway, while transmitting an IP datagram from the source computing node to the destination computing node, translates the source IP address 'address-S' into external IP address 'address-E', and further translates the port number depending upon the direction of transmission and depending upon the IP address assigned to the destination, as discussed above. Typically, the translated IP address and the translated port number replace the (original) source IP address and the source port number stored within the IP datagram (the translated IP address and translated port number being unique to the destination computing node), and the IP datagram incorporating the translated IP address and the translated port number is transmitted by the gateway through to the destination computing node. In a case where IP datagrams are transmitted from the source computing node to the destination computing node via at least one gateway (as described above), the fact that the source IP address and the source port number assigned to the IP datagram are replaced at the gateway with (a) translated IP address and translated port number, imposes further restrictions as far as the implementation of micro-segmentation on a computer network (incorporating the source computing node and the destination computer node inter-alia) is concerned.

Micro-segmentation is a phenomenon that aims to provide micro-level protection for the network components and resources by monitoring and controlling the communications between at least two devices (i.e. the source computing device and the destination computing device in this case) by creating a micro-segment within the computer network, and by categorizing the said two devices as a part of the said micro-segment. Further, the phenomenon of micro-segmentation also aims to regulate the network traffic between the devices forming the micro-segment, based on certain rules preferably pre-established by a network administrator, and to also entrust the network administrator with a level of control and visibility over the communication exchanged between the said two devices forming the micro-segment.

Some of the prerequisites for implementation of micro-segmentation across a computer network include creation of micro-segments across the computer network, and installation of a predetermined network security software at each of the end-point computer devices constituting a micro-segment; the network security software having been programmed to inspect the IP datagrams received by and emanating from the respective end-points, and also to determine whether the said IP datagrams are generated from and directed to trustful endpoints. The phenomenon of micro-segmentation typically aims to implement a zero-trust security policy across the entire computer network, wherein every IP datagram directed to/emanating from an endpoint is deemed at least provisionally suspicious, until the parameters corresponding to the IP datagram including (but not restricted to) source IP address and source port number are analysed by the network security software, and the corresponding IP datagram is categorically identified as not being related to a malicious activity that would in turn compromise the security of the computer network. Typically, any IP datagram whose source IP address and source port number are inspected and categorized as being untrustful, is immediately labelled as a security threat and any further transmission of such an IP datagram is blocked, and consequentially the IP datagram is dropped.

As discussed above, any NAT device, and for instance a gateway handling data traffic between the source computing node and the destination computing node, replaces the source IP address and the source port number corresponding to (and incorporated within) an IP datagram originating from the source computing node, with the translated IP address and translated port number, thereby masking the original source IP address and the source port number and rendering only the translated IP address and translated port number visible. Therefore, the network security software which analyses the IP datagram to determine whether the said IP datagram originated from a trustful source, would be presented with the translated IP address and translated port number instead of the (original) source IP address and source port number which ideally would have acted as a benchmark for establishing the genuineness of the (corresponding) IP datagram. The presence of the translated IP address and translated port number instead of the (original) source IP address and source port number renders the network security software unable to trace the original source IP address and the source port number as well as the path of the IP datagram beyond the (intermediary) gateway, thereby hindering the execution of fine grained network security policies envisaged by (the phenomenon of) micro-segmentation—which propose deducing PACKET DROP and PACKET ACCEPT decisions based on the origin of the corresponding IP datagram.

Further, the fact that more than one gateway could manipulate the IP datagram to translate the source IP address and the source port information incorporated therein, further complicates the task of the network security software in terms of tracing the (original) source IP address and source port number assigned to the IP datagram. Any inadequacy on the part of the network security software to verify the authenticity of an IP datagram, and any perceived deficiency on the part of the IP datagram to fulfil the requirements set forth by the network security polices—for instance, the translated IP address replacing the (original) source IP address of the IP datagram, and the translated IP address not finding a mention in the list of allowable IP addresses prepared in-line with the network security policies—would cause the IP datagram to be labelled as suspicious and as related to a malicious activity, with any further transmission of the IP datagram being immediately blocked and the IP datagram eventually being discarded. Given the fact that the implementation of micro-segmentation entails execution of a zero-trust policy across the computer network, any IP datagram whose source (i.e., source IP address and source port number) cannot be trustfully identified is immediately labelled as malicious activity and discarded, notwithstanding the fact that the original source IP address and source port number of the IP datagram were replaced at one or more (intermediary) gateways with the translated IP address and translated port number.

More often than not, a gateway, which by virtue of its functional configuration replaces the (original) source IP address and source port number assigned to the IP datagram with the translated IP address and translated port number, creates a barrier, often unsurmountable for the implementation of micro-segmentation. However, the phenomenon of micro-segmentation, given its software-only security approach, inherent ability to support fine-grained data security policies, and to implement a zero-trust security policy, forms a critical irreplaceable part of a network security plan, which cannot be jettisoned if a computer network is to be rendered secured down to the lowest possible level (i.e., typically down to the workload level).

In order to overcome the aforementioned barriers and to implement micro-segmentation in a computer network comprising (one or more) gateways, the phenomenon of overlay networks was introduced. The use of overlay networks ensured than even though the addresses and port numbers associated with the IP datagrams transmitted on the underlying IP network were translated, the IP datagrams transmitted using the overlay network were not subjected to network address translation (NAT), and therefore remained suitable for segregation and consequential PACKET DROP and PACKET ACCEPT decisions, based on the source IP addresses and source port numbers associated therewith. However, the use of overlay networks to overcome the barriers created by a conventional IP network for the implementation of micro-segmentation are also manifold including the need for a separate IP address management policy, need for additional overlay tunnels to name a few. Another possible alternative to the use of overlay networks is the phenomenon of out-of-band transmission of NAT information and forwarding information—the NAT information describing the mapping between the source IP address and the external IP address corresponding to an IP datagram, and the forwarding information describing the port interface to be used for transmission of the IP datagram. However, one of the drawbacks associated with the out-of-band transmission methodology is the predominant need for a low-latency communication network which in turn is resource intensive and characterized by comparatively higher packet drop rates.

Yet another alternative to the use of overlay networks and the out-of-band transmission of NAT information and forwarding information is an in-band transmission mechanism which provides for the 'source IP address' and 'source port number' of an IP datagram to be securely stored within the IP datagram itself, in a non-manipulable manner, such that the said source IP address and source port number are rendered accessible in their original form to (a) network security software (installed) at the destination computer node for executing (the) fine grained network security policies envisaged by the phenomenon of micro-segmentation, and to arrive at appropriate PACKET DROP and PACKET ACCEPT decisions based on the origin endpoint of the IP datagram, identifiable via the said source IP address and source port number stored therein. However, one of the draw backs associated with the implementation of the in-band transmission mechanism is an undue increase in the total size of the IP datagram and the consequential transmission overheads, since the IP datagram is re-configured to facilitate secured and non-manipulable storage of the (corresponding) source IP address and source port number therein. Further, implementation of the in-band transmission mechanism also necessitates use of either specialized Kernel Hook Modules (KHM) or specialized sockets or specialized hooks for deriving the information (i.e. source IP address and source port number) to be stored within the IP datagram; with the implementation of such specialized KHM/sockets/hooks creating an additional computational and procedural overhead and consequentially necessitating additional computational resources.

In view of the foregoing, there was felt a need for an effective alternate approach that would not only address the drawbacks associated with overlay networks, out-of-band transmission and in-band transmission methods but also facilitate simultaneous implementation of micro-segmentation as well as traditional network gateways in a computer network, without compromising on neither the security of the computer network nor the operational efficiency of the computer network. There was felt a need for a computer implemented system and method that enables network security software installed at various endpoints of the computer network with unhindered access to the source IP address and source port number of an IP datagram notwithstanding the fact that the IP datagram was routed through at least one gateway which in turn replaced the (original) source IP address and source port number with (a) translated IP address and translated port number respectively.

OBJECTS

An object of the present disclosure is to envisage a computer implemented system and method that provides for eliciting NAT mapping information from corresponding Port Control Protocol (PCP) packets.

Yet another object of the present disclosure is to envisage a computer implemented system and method that provides for effective implementation of network micro-segmentation.

One more object of the present disclosure is to envisage a computer implemented system and method whose implementation would not entail any increase in the overall size of a network packet.

Still a further object of the present disclosure is to envisage a computer implemented system and method that obviates the need for tapping into the TCP/IP network protocol stack of a computing node using either specialized Kernel Hook Modules or sockets or hooks, in order to learn (at least a part of) NAT information therefrom.

Yet another object of the present disclosure is to envisage a computer implemented system and method that does not necessitate the presence of a snooping agent in-line with a flow path of the PCP packets, but only necessitates the snooping agent to be present in the same layer-2 broadcast domain (as that of the PCP packets).

SUMMARY

The present disclosure is summarized taking into consideration a typical IP datagram transmission scenario which in turn involves an IP datagram created at a source computing node being transmitted to a destination computing node. Typically, the source computing node, which creates the said IP datagram is described as being connected to a source computer network, and the destination computing node is described as being connected to a destination computer network. Preferably, the source computer network is connected to the destination computer network via at least one intermediary outside network, with specifically programmed NAT devices (gateways) functioning as interfaces between the source computer network, the destination computer network and intermediary outside computer network.

Further, the IP datagram created at the source computing node is associated with the corresponding 'source IP address' and 'source port number', which in combination, is used not only to indicate the status of the source computing node as the creator of the said data packet, and also to identify the IP datagram within the source computer network as originating from and belonging to the source computing node. While the combination of the 'source IP address' and 'source port number' is sufficient to uniquely identify the corresponding source computing node within the source computer network, it is necessary that the 'source IP address' and 'source port number' are translated or mapped to one or more different IP address(es) and different port number(s) respectively, so as to facilitate unique identification of the source computing node on one or more outside networks as well as the destination computer network (given the possibility that the 'source IP address' and 'source port number' previously assigned to the IP datagram do not uniquely identify the corresponding source computing node on the one or more outside networks and the destination computer network), thereby facilitating appropriate transmission of the IP datagram via at least one outside network, through to the destination computer network.

Since, the 'source IP address' and 'source port number' originally assigned to the IP datagram do not uniquely identify the source computing node on one or more outside networks and the destination computer network, an appropriately programmed network address translator (for example, a gateway) translates or maps the 'source IP address' and 'source port number' to (one or more) different IP address(es) and different port numbers) referred to as translated IP address and translated port number respectively—so as to facilitate unique identification of the source computing node within the one or more outside networks and the destination computer network, and to further facilitate a seamless transmission of the IP datagram from the source computer network to the destination computer network via one or more outside networks.

The computer implemented method, the corresponding computer implemented system and computer program product envisaged by the present disclosure anticipate the default behaviour of the Network Address Translation (NAT) device (for instance, a gateway)—which is characterized by replacement of the source IP address and the source port number (mapping information) stored in the IF header of the IF datagram with a translated IP address and translated port number—and accordingly envision a snooping mechanism using which the NAT mapping information, i.e. the mapping of the internet IP address & internal port number pair to a corresponding external IP address & external port number pair, as created by an intermediary NAT device (gateway) can be identified and subsequently analysed (by a network security software) to create network security polices governing PACKET ACCEPT and PACKET DROP decisions. It is pertinent to note that the network security polices created by the network security policy software are based on the source IP address and the source port number identified to be associated with the IF datagram, and not on the translated IP address and the translated port number which are assigned to the IP datagram at the NAT device (gateway).

By envisioning a snooping mechanism to learn the NAT mapping information linking the source IP address and source port number pair (previously referred to as internal IP address and internal port number pair) with the translated IP address and the translated port number, the present disclosure anticipates the phenomenon of the source IP address and source port number present in the IP header (of the IP datagram) being replaced by the translated IP address and the translated port number, at an intermediary gateway, and therefore proposes an effective countermeasure to nullify the probable implications of such a replacement, on the implementation of micro-segmentation across the computer network being utilized for creation and transmission of the IP datagram.

BRIEF DESCRIPTION OF THE ACCOMPANYING DRAWINGS

Figure 2:
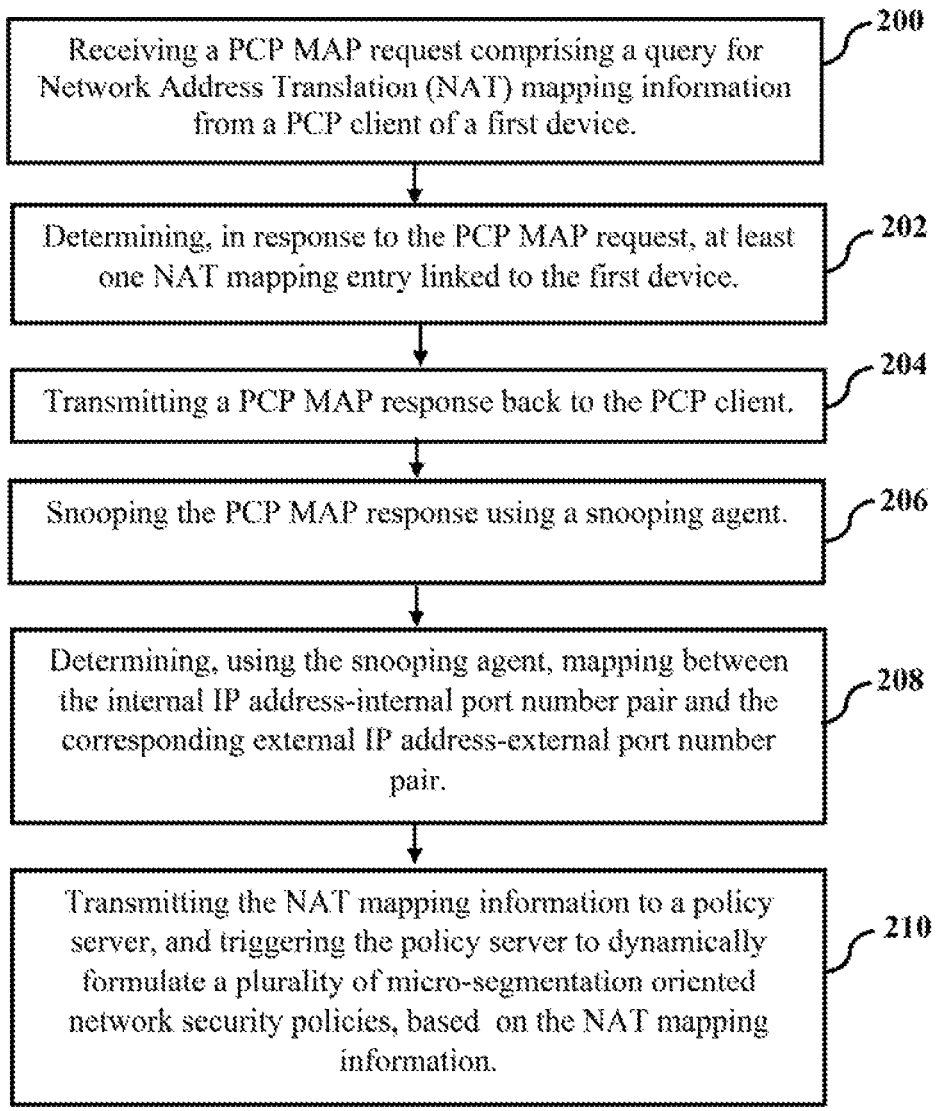

FIG. 1 illustrates an exemplary network environment comprising a computer-implemented system for learning Network Address Translation mapping information by snooping on Port Control Protocol (PCP) packets; and FIG. 2 illustrates a flowchart describing the steps involved in the computer-implemented method for learning Network Address Translation mapping information by snooping on Port Control Protocol (PCP) packets.

DETAILED DESCRIPTION

In accordance with the present disclosure, the 'source IP address' and 'source port number' associated with an IP datagram always denote the origin of the IP datagram (the origin being the 'source computing node 10'.). The terms 'source IP address' and 'source port number' are also referred to as 'internal IP address' and 'internal port number' respectively. Since both sets of terminologies carry the same meaning, the terms 'source IP address', 'source port number' and 'internal IP address', 'internal port number' are used interchangeably.

Referring to FIG. 1 there is shown an exemplary network environment 100 comprising at least one 'source computing node' 10 communicably coupled to at least one 'destination computing node' 14 via at least one translator 12. In accordance with the present disclosure, the translator 12 is a sufficiently configured network address translator (NAT device) capable of remapping at least the address space associated with the source computing node 10 to the address space associated with the destination computing node 14.

In accordance with the present disclosure, the 'source IP address' and 'source port number' associated with an IP datagram always denote the origin of the IP datagram (the origin being the 'source computing node 10'.). The terms 'source IP address' and 'source port number' are also referred to as 'internal IP address' and 'internal port number' respectively. Since both sets of terminologies carry the same meaning, the terms 'source IP address', 'source port number' and 'internal IP address', 'internal port number' are used interchangeably. Consequentially, the term 'source IP address-source port number pair' is also used interchangeably with the term 'internal IP address-internal port number' pair.

Preferably, the source computing node 10 is considered as a part of a source computer network 10A while the destination computing node is construed to be a part of a destination computer network 14A. The translator 12 (for instance a gateway; also referred to as a NAT device) is operable to facilitate mapping of a 'source network address' associated with the source computer network 10A to a 'destination network address' associated with the destination computer network 14A, so as to facilitate a seamless communication between the source computing node 10 (which is communicably coupled to the source computer network 10A) and the destination computing node 14 (which is communicably coupled to the destination computer network 14A). Preferably, the translator 12 is assigned a plurality of 'destination network addresses', which are in turn used to enable an IP datagram emanating from the source computing node 10 to be uniquely identified on the destination computer network 14A.

Typically, whenever the source computing node 10 desires to communicate with the destination computing node 14, the translator 12 assigns an 'external IP address' uniquely identifying the source computing node 10 within the destination computer network 14A for a period of time sufficient to perform the desired communication with the destination computing node 14. The 'external IP address' thus assigned to the 'outgoing' IP datagram replaces the 'source network address' (source IP address) corresponding to the 'outgoing' IP datagram, thereby facilitating (unique) identification of the outgoing IP datagram on the destination computer network 14A. It is also routine that the translator 12 additionally translates a corresponding 'source port number' into an 'external port number' so as to facilitate proper routing of the 'return traffic' (for instance, response messages) to the appropriate (initiating) source computing node 10. In the scenario described above, since the 'source IP address' and 'source port number' are translated into corresponding 'external IP address' and 'external port number' respectively, the 'external IP address' and 'external port number' are also referred to as 'translated IP Address' and 'translated port number' respectively. It is also pertinent to note that the terms 'external network address' and 'external port number' are used interchangeably with the terms 'translated IP address' and 'translated port number'. Consequentially, the term 'external IP address-external port number pair' is also used interchangeably with the term 'translated IP address-translated port number pair'.

However, the phenomenon of the translator 12 replacing the 'source IP address' and the 'source port number' with the 'translated IP address (external IP address)' and 'translated port number (external port number)' respectively, proves to be a deterrent for implementation of micro-segmentation across the network environment 100. Typically, the phenomenon of micro-segmentation involves creating fine-grained security policies that can be specifically tailored to suit the requirements of individual constituents (individual computer nodes) of the network environment 100. Typically, micro-segmentation facilitates creation of 'workload level' security policies which in turn can be conceptualized specifically for individual computing nodes based on inter-alia the 'data sensitivity and application sensitivity associated with individual computing nodes', 'access permissions associated with individual computing nodes' and 'the interconnectivity regulations applicable to each of the computing nodes'.

One of the major advantages of micro-segmentation is that it creates fine-grained security policies which when executed limit application and network flows between individual computing nodes to those which are explicitly permitted, thereby transforming the (traditional) network environment into a zero-trust network environment wherein data communications between individual computing nodes are enabled, only if they are explicitly permitted by the corresponding security policies. However, creating such fine-grained security policies and rendering the fine-grained security policies suitable for individual computing nodes, requires any IP datagrams directed to individual computing nodes to be profiled on the basis of the corresponding 'source IP address' and 'source port number', before being labelled as either legitimate and consequentially trustful or as untrustful and consequentially a network-security threat. However, the phenomenon of the translator 12 replacing the 'source IP address' and 'source port number' of the outgoing IP datagram with the 'translated IP address' and 'translated port number' is a serious detriment to the implementation of micro-segmentation since it is impossible for a 'policy controller' resident on the destination computing node 14, to profile the 'incoming' IP datagram on the basis of the 'source IP address' and 'source port number', given the fact that the 'source IP address' and 'source port number' have already been replaced with the translated IP address and translated port number, thereby making it impossible for the (network path of the) IP datagram to be traced beyond the translator 12, and also given the fact that the translator 12 is not the original origin end-point of the incoming IP datagram. The non-availability of 'source IP address' and 'source port number' in case of an incoming IP datagram, in view of the said combination being replaced by corresponding translated IP address and translated port number, and the inability (on the part of the policy controller) to trace the network path of the incoming IP datagram beyond the translator 12, and the fact that a translator (12) is never an origin of an (the) IP datagram causes serious impediments for execution of micro-segmentation on a computer network comprising computing nodes (end-point devices) connected to a plurality of other computing nodes via the (network address) translator 12.

Therefore, in order to facilitate seamless implementation of micro-segmentation, even on computer networks having a plurality of computing nodes interconnected via one or more network address translators, the present disclosure envisages a computer-implemented method (and a corresponding computer-implemented system and computer program product) that anticipates the default behaviour of the network address translator 12—the default behaviour characterized by replacement of the source IP address and the source port number stored in the IP header of the IP datagram with a translated (external) IP address and translated (external) port number—and counteracts the default behaviour of the translator 12 to not only identify the source IP address and source port number originally assigned to the (outgoing) IP datagram, based on a mapping between the said source IP address-source port number pair and the corresponding translated IP address-translated port number pair, but to also facilitate effective implementation of micro-segmentation on (at least) the destination computer network 14A, by construing dynamic PACKET ACCEPT and PACKET DROP decisions across the destination computer network 14A, based on the source IP address and source port number which are in turn identified to be originally associated with the IP datagram (when the said IP datagram was initially transmitted from the source computing node 10) based on the mapping between the source IP address and source port number, and the translated IP address and translated port number pair assigned to the IP datagram by the translator 12 as a replacement for the (original) source IP address and source port number.

As discussed hitherto, the computer-implemented method (and the system and computer program product) envisaged by the present disclosure proposes an effective countermeasure to the phenomenon of the source IP address and source port number (stored within an IP header) of the IP datagram being replaced by a translated IP address and translated port number, thereby causing impediments to the implementation of network micro-segmentation whenever the IP datagram is routed via the Network Address Translator 12, by facilitating snooping of the mapping information and identification of the source IP address and source port number corresponding to the IP datagram based on the snooped mapping information. The computer implemented method (and the system and computer program product) envisaged by the present disclosure ensures that the source IP address and source port number—which in combination constitute the information identifying the source computing node 10 as the origin endpoint of the IP datagram—is made available at the destination computer node 14 and in turn at the destination computer network 14A despite the IP datagram having being routed through (at least one) Network Address Translator 12 before reaching the destination computing node 14, and also despite the Network Address Translator 12 having manipulated the IP header of the said IP datagram by replacing the source IP address and source port number stored therein, with the translated IP address and translated port number.

As described in FIG. 1, the exemplary network environment 100 incorporates the source computing node 10 communicably coupled to the destination computing node 14 via at least one (network address) translator 12. It is apparent that the source computing node 10 and the destination computing node 14 serve as end-points ('origin endpoint' and 'destination endpoint' respectively) of an end-to-end communication connection/session established between the source computing node 10 and the destination computing node 14. Preferably, the source computing node 10 and the destination computing node 14 are one of mobile user devices, computers and any suitable computer-implementable devices incorporating the logic necessary for implementing a communication application and a PCP client inter-alia. Preferably, the source computing node 10 is configured to create digitally encoded information and further arrange the digitally encoded information in the form of network packets, prior to transmission thereof across a (connection-oriented packet switching) network, for rendering a variety of communication services including but not restricted to file transfers, email messaging, internet browsing, gaming services, and content streaming. The network packets created by the source computing node 10 are designated to be transmitted to the destination computing node (denoted by reference numeral 14 in FIG. 1), thereby allowing the source computing node 10 to communicate with the destination computing node 14 via exchange of IP datagrams.

In accordance with the present disclosure, whenever the source computing node 10 creates a network packet purported to be transmitted to the destination computing node 14, the network packet thus created is firstly processed at the transport layer (of the TCP/IP protocol stack incorporated within the source computing node 10). Typically, every network packet created by the source computing node 10 includes a 'header portion' and a 'payload portion'. Preferably, the header portion of the network packet constitutes a TCP header which is generated and appended onto the network packet at the transport layer. Further, the 'data' to be transmitted from the source computing node 10 to the destination computing node 14 is segregated into the 'payload portion' of the network packet, at the transport layer.

Typically, the TCP header constituting the 'header portion' of the network packets incorporates at least a 'source port number' and a 'destination port number'. Preferably, the transport layer identifies the source port (the port used for transporting the network packet from the source computing node 10) as well as the destination port (the port used on the destination computing node 14 for receiving the network packet from the source computing node 10). The identifiers corresponding to the source port and the destination port. i.e. the 'source port number' and the 'destination port number' are identified and incorporated into the TCP header of the network packet, by the transport layer.

Subsequently, the network packet comprising the TCP header (header portion) and the data (payload portion) is received at the internet layer, to be prepared for delivery to the destination computing node 14. The internet layer, on its part, processes the network packet and appends an IP header on top of the TCP header, prior to converting the (received) network packet into an IP datagram. Accordingly, post processing by the internet layer, the IP datagram incorporates the IP header, the TCP header and the data to be transmitted to the destination computing node 14 (payload portion).

Typically, the network packet (comprising the TCP header and the data) is received by the Internet layer (of the TCP/IP protocol stack incorporated within the source computing node 10), which, on its part prepares the received network packet for delivery to the destination computing node 14, by the way of formatting the network packet into an IP datagram, and by further attaching an IP header to the network packet as a part of such a transformation. Typically, the internet layer processes the network packet and adds an IP header on top of the TCP header, prior to converting the network packet into an IP datagram. Therefore, post the transformation by the internet layer, the IP datagram incorporates an IP header as well as the TCP header and the data to be delivered to the destination computing device 14. The IP header added on top of the TCP header includes the fields 'source address' and 'destination address' inter-alia. It is pertinent to note that only those fields of the IP header which are of relevance to the subject matter of the present disclosure are discussed herein, and the other possible fields of the IP header, which are believed to be of no relevance to the subject matter of the present disclosure have been omitted for the sake of brevity.

As discussed above, the 'source address' field of the IP header stores a 32-bit address indicative of the origin endpoint of the network packet, i.e. the source computing node 10 (referred to as 'source IP address' hereafter). Similarly, the 'destination IP address' field of the IP header stores a 32-bit address indicative of the destination endpoint of the network packet, i.e. the destination computing node 14.

Referring again to the TCP/IP protocol stack incorporated within the source computing node 10, the IP datagram created at the internet layer is subsequently formatted into a corresponding 'frame' at the Data-Link Layer (of the TCP/IP protocol stack incorporated within the source computing node 10), before being sent out (by the physical layer; which is also a part of the TCP/IP protocol stack incorporated within the source computing node 10) on the source computing network 10A for transmission to the destination computing node 14. It is pertinent to note that the explanation provided herein concentrates only on those procedures/steps which are relevant to the context of the present disclosure. While it is acknowledged that the network packet would typically undergo a multitude of procedures/steps, such procedures/steps have been omitted for the sake of brevity since such procedures/steps are deemed as not being relevant to the scope of the present disclosure.

Preferably, the IP datagram put out on the source computing network 10A (for transmission onto the destination computing node 14) is received by the translator 12. Typically, the translator 12 which functions as an intermediary between the source computing node 10 and the destination computing node 14, receives and processes every IP datagram directed to the destination computing node 14. As a part of the well-established default processing mechanism, the translator 12 manipulates the 'source IP address' and the 'source port number' fields of the IP header incorporated within the IP datagram (received from the physical layer of the TCP/IP protocol stack of the source computing node 10), and replaces the 'source IP address' and the 'source port number' stored therein—the source IP address and source port number usable in uniquely identifying the IP datagram within the source computing network 10A—with a translated IP address and translated port number respectively, such that the IP datagram transmitted outwards from the translator 12 is uniquely identifiable on an intermediary outside network (or the destination computing network 14A) based on the translated IP address and the translated port number. In accordance with the present disclosure, the process of translator 12 replacing the source IP address and source port number pair with the translated IP address and translated port number pair is referred to as 'mapping' or 'translation', and the translator 12 is configured to maintain a 'translation table' describing the mapping between every source IP address-source port number pair and translated IP address-translated port number pair.

This behaviour on the part of the translator 12, which it has been programmed to exhibit by default, is a challenge to preclude since translators (12) are almost irreplaceable given an everlasting need to facilitate data transfer and information sharing between computer nodes situated across geographically dispersed, discrete computer networks. However, while it is always a challenging task to prevent the translator 12 from replacing the 'source IP address' and 'source port number' embedded within the IP header of the (received) IP datagram, with the corresponding translated IP address and translated port number, the continued availability of appropriate mapping information (i.e. the 'source IP address' and 'source port number') within the IP datagram for linking the IP datagram to the origin endpoint thereof is an unavoidable prerequisite for implementation of micro-segmentation.

As discussed earlier, in order to facilitate effective implementation of micro-segmentation across various end-point devices of a computer network, it is imperative that the 'source IP address' and the 'source port number' identifying the origin endpoint (i.e. the source computing node 10 in this case) of an IP datagram (in transit via the translator 12) are rendered available to a policy server 16 entrusted with the responsibility of implementing micro-segmentation across the end-point devices, so that the policy server 16 could consequentially identify the origin endpoint of the said IP datagram, and accordingly deduce either a PACKET DROP decision or a PACKET ACCEPT decision inline with predetermined micro-segmentation policies which in turn use at least the origin end-point of the incoming datagram (indicated by the combination of source IP address and source port number) as a benchmark for affirming the PACKET DROP decision and the PACKET ALLOW decision.

However, as discussed earlier, the translator 12, by virtue of its default behaviour replaces the 'source IP address' and 'source port number' (incorporated within the IP header) of the IP datagram with a translated IP address and translated port number, thereby causing a serious detriment to the implementation of micro-segmentation policies, since it becomes impossible for the micro-segmentation controller installed at the destination computing node 14 to profile the IP datagram as having been originated from a trustful source computing node (10) and to trace the network path of the IP datagram beyond the translator 12, since the 'source IP address' and 'source port number' categorically identifying the source computing node 10 as the source (origin endpoint) of the IP datagram have already been replaced with the translated IP address and translated port number, by the translator 12.

In order to anticipate this default behaviour of the translator 12, the present disclosure envisages a method for learning Network Address Translation mapping information by snooping on Port Control Protocol (PCP) packets. Typically, the Port Control Protocol (PCP) is useful in allowing an Internet Protocol Version 4 (IPv4) or Internet Protocol Version 6 (IPv6) based host computer device to control how incoming IPv4 or IPv6 packets (IP datagrams) are translated and forwarded by (a) the network address translator 12. Typically, using the Port Control Protocol, a host computer device (for example, a PCP client) could control how an upstream device, i.e. the (network address) translator 12 in this case, forwards the incoming packets (IP datagrams). The Port Control Protocol facilitates creation of a mapping from an external IP address and external port number (derived by the network address translator 12; and therefore referred to as translated IP address and translated port number) to an internal IP address and internal port number (originally assigned to the IP datagram at the source; source computing node 10 in this case; and therefore also referred to as source IP address and source port number respectively). Whilst facilitating creation of a mapping as described above, the Port Control Protocol also provides for the mapping (including the translated IP address and translated port number) to be communicated preferably in advance to remote computer devices (in this case the destination computing device 14) purported to receive the corresponding IP datagram. The present disclosure proposes leveraging the aforementioned characteristics of the Port Control Protocol in learning the mapping information (between the source IP address-source port number pair and the external IP address-external port number pair), and subsequently using the learnt mapping information to accurately trace an (incoming) IP datagram at the destination computing node 14 back to the respective origin endpoints based on the mapping information and consequentially process the incoming IP datagram based on fine-grained, micro-segmentation based security policies— which are established and executed in dependency with the source IP address and source port number assigned to the incoming IP datagrams—despite the (intermediary) translator 12 replacing the source IP address and source port number stored within the IP header of the IP datagram with a corresponding translated IP address and translated port number, by the virtue of the default behaviour programmed to be performed by the translator 12.

The execution of the method, as described in FIG. 2 begins when the translator (denoted by reference numeral 12 in FIG. 1) receives an IP datagram from the source computing node (denoted by reference numeral 10 in FIG. 1) and replaces the source IP address and source port number incorporated (within the header portion of the IP datagram) therein with the translated IP address and translated port number.

In accordance with the present disclosure, the source computing node 10 preferably incorporates a PCP client 10B which has been configured to communicate with a PCP server 10C by the way of transmitting PCP MAP requests thereto. The PCP client 10B is also configured to trigger the PCP server 10C to respond to the respective PCP MAP requests by establishing and transmitting corresponding PCP MAP responses which in turn include mapping information representing a mapping between the source IP address-source port number pair (assigned to an IP datagram at the source computing node 10) and the translated IP address-translated port number pair (assigned to the IP datagram as a replacement of the source IP address-source port number pair, at the translator 12). Preferably, the PCP client 10B (incorporated within the source computing node 10) can be a part of the operating system installed within the source computing node 10 or can be coded entirely in an application (like an application-level protocol), and executed on the source computing node 10. Further, the PCP server 10C is preferably embedded within the translator 12, while it is also possible that the PCP server 10C remains a stand-alone device and periodically interacts with the translator 12 and the PCP client JOB to establish and transmit the mapping information.

Preferably, at step 200 and as soon as the IP datagram is transmitted to the translator 12 via the source computing network 10A, the source computing node 10 (referred to as 'first device' in the claims), and specifically the PCP client 10B incorporated within the source computing node 10 generates and transmits a PCP query to a PCP server 10C to determine the translated IP address and translated port number that have been substituted for the (original) source IP address and source port number previously incorporated within the (header portion of the) IP datagram.

In accordance with the present disclosure, the PCP query generated by the PCP client JOB is a PCP MAP REQUEST which typically facilitates learning and subsequent publishing of information corresponding to the mapping between an internal IP address & an internal port (referred to as source IP address and source port number), and an external IP address & an external port (referred to as translated IP address and translated port number). A PCP MAP request generated by the PCP client 10B includes inter-alia an 'internal port' field, a 'suggested external port' field, a 'suggested external IP address' field and a 'protocol' field. It is pertinent to note that the explanation provided herein concentrates only on those fields of the PCP MAP request which are deemed relevant to the subject matter of the present disclosure, and the other fields (of the PCP MAP request) which are deemed not as important as the former are omitted for the sake of brevity.

In accordance with the present disclosure, the field 'internal port' denotes the port number assigned to the internal port used for transmitting the PCP MAP request. However, in this case, since the PCP client 10B is considered to be hard-coded into the operating system of the source computing node 10, the 'internal port' would be the source port (the port used by the source computing node 10 to transmit the PCP MAP request). The field 'suggested external port', as the name implies, denotes the external port suggested to be used by the translator 12 for the mapping (translation). Further, the field 'suggested external IP address', as the name implies, denotes the external IP address suggested to be used by the translator 12 for the mapping. The field 'protocol', as the name implies, denotes the protocol to be used for creating the mapping between the source IP address-source port number pair and the external IP address-external port number pair. Typically, a value 'six' assigned to the protocol field denotes a TCP mapping, while a value 'seventeen' denotes a UDP mapping. Additionally, a value 'zero' assigned to the protocol field symbolizes that the mapping could be applicable to all the protocols.

Further, it is possible that the suggested external IP address and the suggested port number are not allocated to the PCP client, and preferably, the PCP client 10B is programmed to assume that the 'suggested external IP address' and 'suggested external port number' are never assigned, and also to function with an external IP address and external port number different than the 'suggested external IP address' and 'suggested external port number'.

Subsequently, at step 202, the PCP server 10C processes the PCP MAP request, and firstly determines the origin endpoint (i.e. the source computing node 10 in this case) from which the PCP MAP request originated. Typically, since the PCP MAP request originated from the source computing node 10, the IP address assigned to the source computing node 10, i.e. the source IP address is construed as the 'internal address' of the PCP MAP request.

In accordance with the present disclosure, while preparing a PCP MAP RESPONSE for a previously received PCP MAP REQUEST, the PCP server 10C processes at least the 'internal port', 'suggested external port', 'protocol' and the 'suggested external IP address' fields specified in the PCP MAP REQUEST. Firstly, the PCP server 10C determines the value stored within the 'protocol' field and the 'internal port' field. To begin with, the PCP server 10C uses the combination of the values assigned to the 'protocol' field and the 'internal field' to decide on the best mode of action, as far as the processing of the PCP MAP REQUEST is concerned. For instance, if both the 'protocol' and 'internal port' fields are 'non-zero', the PCP server 10C interprets the corresponding PCP MAP REQUEST as a request for creating a new mapping basis the specified protocol and the specified port, whereas if both the 'protocol' and 'internal port' fields are 'zero', the PCP server 10C creates a mapping for all the (available) protocols across all the (available) ports. Additionally, if the 'protocol' field holds a 'non-zero' value and the 'internal port' field holds 'zero', then the PCP server 10C creates a mapping for all the incoming data traffic (IP datagrams) for the entire protocol specified by the 'protocol' field.

Subsequently, the PCP server 10C analyses the 'suggested external port' and 'suggested external IP address' fields and compares the suggested external port number and the suggested external IP address with the internal port number and the corresponding internal IP address (the internal port number and internal IP address being the source port number and source IP address, in this case). Subsequent to the comparison, the PCP server 10C determines whether there exists a mapping between the internal port number-internal IP address pair and the suggested external port number-suggested external IP address pair. Further, in the event the PCP server 10C determines that there does not exist a mapping between the internal port number-internal IP address pair and the suggested external port number-suggested external IP address pair, then the PCP server 10C subsequently attempts to create a mapping between the said internal port number-internal IP address pair and the said suggested (via the PCP MAP REQUEST) external port number-external IP address pair.

In the event that the PCP server 10C is rendered unable to create a mapping between the said internal port number-internal IP address pair and the suggested external port number-suggested external IP address pair the reasons for the PCP server 10C being unable to create the requested mapping being multifold including the suggested external port number and external IP address having been assigned to another mapping, suggested external port number and external IP address being rendered unavailable for mapping on account of use by the translator 12 for its own services, suggested external port number and external IP address being prohibited by the PCP server's (10C) policy, suggested external port number and external IP address being invalid, suggested external IP address being regarded as not belonging to the translator 12, and suggested external IP address not being configured to be used as an external IP address of the translator 12—an another external port number-external IP address (which is different from the suggested external port number-external IP address) pair is assigned, by the PCP server 10C in response to the PCP MAP REQUEST, and the assigned external port number and external IP address are communicated to the PCP client 10B via a corresponding PCP MAC RESPONSE (at step 204). Essentially, the PCP MAC RESPONSE returns the newly assigned external port number and external IP address to the PCP client 10B, in the form of a response message. Subsequently, the PCP client 10B processes the PCP MAC RESPONSE received from the PCP server 10C and consequentially learns the mapping between the source IP address-source port number pair and the external IP address-external port number pair.

In accordance with an alternate embodiment of the present disclosure, at step 200, instead of generating a PCP MAP REQUEST, the source computing node 10 and more specifically the PCP client 10B installed within the source computing node 10 could generate a PCP PEER REQUEST. The PCP PEER REQUEST facilitates creation of a new dynamic outbound mapping to a remote Peer's IP address and port. The PCP PEER REQUEST typically incorporates 'five' fields, i.e. 'protocol', 'internal port', 'suggested external port', 'suggested external IP address', which are similar to the PCP MAP REQUEST. Additionally, the PCP PEER REQUEST includes 'two' more fields 'remote Peer port' and 'remote Peer IP address' which are absent in the PCP MAP REQUEST.

As the name suggests, the field 'remote Peer port' describes the port number corresponding to the remote Peer, while the field 'remote Peer IP address' describes the IP address of the remote Peer from the perspective of the PCP client 10B. Typically, subsequent to receiving the PCP PEER REQUEST, the PCP server 10C processes the received PCP PEER REQUEST and consults a mapping table to identify therefrom an entry matching the 'protocol', internal port number', 'internal IP address'—derived based on the internal port number, 'remote Peer address', and 'remote Peer port' specified by the received PCP PEER REQUEST.

In accordance with the present disclosure, if the PCP server 10C does not find, within the mapping table a matching five-tuple, i.e. an entry in the mapping table matching the 'protocol', internal port number', 'internal IP address', 'remote Peer address', and 'remote Peer port' specified by the PCP PEER REQUEST, and if the 'suggested external port' and suggested external IP address'fields of the PCP PEER REQUEST are non-zero and if it is determined (by the PCP server 10C) that the 'suggested external port' and suggested external IP address' can be allocated for the specified protocol, then the PCP server 10C creates an outbound mapping to the Peer's port number and Peer's IP address. Subsequently, the PCP server 10C generates an appropriate PCP PEER RESPONSE (step 204) directed to the PCP client 10C and specifying the 'assigned external port' and the 'assigned external IP address' for the newly created mapping. Further, the values of the fields 'protocol', 'internal port', 'remote Peer port' and 'remote Peer IP address' are copied as they are from the PCP PEER REQUEST onto the PCP PEER RESPONSE prior to the transmission of the PCP PEER RESPONSE to the PCP client 10B.

However, subsequent to consulting the mapping table, if the PCP server 10C finds an entry within the mapping table matching the 'protocol', internal port number', 'internal IP address'—derived based on the internal port number, 'remote Peer address', and 'remote Peer port' specified by the received PCP PEER REQUEST, and if no previous PEER request has been successfully processed for the said mapping (found within the mapping table), then the PCP server 10C ignores the 'suggested external port' and suggested external IP address'entries and subsequently adjusts the lifetime of the mapping. In such a case, the PCP server 10C communicates the information about the existing mapping back to the PCP client 10B, preferably via an appropriate PCP PEER RESPONSE. In both of the aforementioned scenarios, the PCP server 10C transmits a PCP PEER RESPONSE back to the PCP client 10C, informing the PCP client 10C of a successful creation of a mapping between the Peer's IP address and Peer's port and the external IP address and external port. As explained above, the PCP PEER RESPONSE also includes information indicating the internal port number and the internal IP address (deduced from the internal port number) corresponding to the mapping.

In accordance with the present disclosure, at step 206, a snooping agent 18, for example, a layer-2 switch (not shown in figures), is configured to snoop on either the PCP MAP RESPONSE or the PCP PEER RESPONSE. The snooping agent 18, in accordance with the present disclosure, is present on the same network path as that of the PCP client 10B and PCP server 10C. Alternatively, the snooping agent 18 is a part of the operating system installed within the source computing node 10. Alternatively, the snooping agent 18 can also be coded entirely in an application (like an application-level protocol) and embedded into the source computing node 10 for subsequent execution. In yet another implementation, the snooping agent 18 can be implemented in software executed on the layer 2 switch.

In accordance with the present disclosure, the snooping agent 18 is configured to capture either the PCP MAP RESPONSE packets or the PCP PEER RESPONSE packets, and analyze the captured PCP MAP RESPONSE packets/the captured PCP PEER RESPONSE packets, and identify at least the 'source IP address (internal IP address)'. 'source port number (internal port number)', external port number and external IP address embedded therein. Subsequently, the snooping agent, basis the source IP address, source port number, external port number and external IP address derived from either the POP MAP RESPONSE or the PCP PEER RESPONSE, derives the mapping (relationship) between the source IP address-source port number pair and the corresponding external IP address-external port number pair.

Subsequently, the snooping agent 18 transmits the derived mapping between the source IP address-source port number pair and the corresponding external IP address-external port number pair, for further analysis to a (remote) policy server 16. In accordance with the present disclosure, the policy server 16 incorporates a pre-configured network security software, which in turn receives and analyses the mapping information (describing the mapping between the source IP address-source port number pair and the corresponding external IP address-external port number pair).

In accordance with the present disclosure, the policy server 16, by the virtue of the network security software installed therein, is configured to incorporate a plurality of predefined firewall rules provisioning communication between a plurality of computer nodes based on at least the IP address and the port number associated with a requesting computing node (the node which requests for a communication to be initiated; also referred to as a source computing node) as well as the IP address and the port number associated with a requested computing node (the node with which a communication has been requested; also referred to as a destination computing node).

In accordance with the present disclosure, the snooping agent 18, subsequent to learning the NAT mapping information describing the mapping relationship between each source IP address-source port number pair and the corresponding external IP address-external port number pair, by the way of snooping, transmits the learnt mapping information to the network security software installed on the policy server 16 for further analysis, and for subsequent creation of micro-segmentation oriented firewall rules/network, security polices which are based on the mapping information—indicative of the mapping between the original source IP address-source port number pair and the external IP address-external port number pair—learnt by the snooping agent 18, by the way of snooping on a corresponding PCP MAP RESPONSE packet or PCP PEER RESPONSE packet.

In accordance with the present disclosure, the network security software installed within the policy server 16 utilizes the mapping information received from the snooping agent 18 to formulate a plurality of micro-segmentation oriented firewall rules/network security policies executable at various micro-segments, i.e., various end-points of (a) the computer network. Considering an IP datagram directed to a particular end-point device as an example, the mapping between the source IP address-source port number pair (also referred to as internal IP address-internal port number pair) originally assigned to the IP datagram and the external IP address-external port number pair which is used by the network address translator 12 as a replacement for the internal IP address-internal port number pair, is known to the policy server 16 beforehand the creation of the micro-segmentation oriented firewall rules/network security policies, basis the snooping of the corresponding PCP MAP RESPONSE packet or PCP PEER RESPONSE packet. The snooping (by the snooping agent 18) of the PCP MAP RESPONSE packet or PCP PEER RESPONSE packet not only enables the snooping agent 18 to decipher the mapping between (an) the internal IP address-internal port number pair and the external IP address-external port number pair—while the corresponding IP datagram is in transit via the translator 12—but also enables the snooping agent 18 to inform the policy server 16 beforehand (i.e., before the creation of micro-segmentation oriented firewall rules/network security policies) about the substitution of the original internal IP address-internal port number pair corresponding to the IP datagram in transit with an external IP address-external port number pair which is generated by the translator 12.

The micro-segmentation oriented firewall rules/network security policies (referred to as 'firewall rules/network security policies' hereafter) created by the policy server 16 are securely stored in a policy database (not shown in figures) communicably coupled to the policy server 16. Preferably, the firewall rules/network security policies are transmitted to individual end-point devices of a computer network, and the policy enforcement agent applications installed on respective end-point devices are triggered to implement the (received) firewall rules/network security policies. Preferably, each of the policy enforcement agent applications executed on respective end-point devices receive periodically updated versions of firewall rules/network security policies from the policy server 16 at predefined time intervals, so as to facilitate an effective implementation of appropriate PACKET ACCEPT/PACKET DROP decisions based on the (latest versions of the) firewall rules/network security policies. It is apparent that the firewall rules/network security policies created by the policy server 16 are periodically updated based on the need to provide end-point devices with controlled access to the IP Datagrams (and the data embedded therein) and especially the incoming IP datagrams, i.e., the IP datagrams received at end-point devices, and also based on the need to ensure that the end-point devices communicate with one another strictly on a need basis, and further based on the need to prevent end-point devices from establishing any unauthorized communication channels with other end-point devices.

Preferably, the firewall rules/network security policies created by the policy server 16 are machine (end-point device) specific. The scale and consequence of implementation the said firewall rules/network security policies vary from end-point to end-point, based at least on the characteristics of the end-point (including the source IP address-source port number assigned to the end-point, and the destination IP address-destination port number pairs allowed to communicate with the end-point). Preferably, an end-point specific micro-segmentation oriented firewall rule/network security policy specifies the source IP address and source port number pairs which are allowed to transmit IP datagrams to the end-point device, in addition to also defining the destination IP address and destination port number pairs that the end-point device is allowed to communicate with. Accordingly, the data traffic (flow of IP datagrams) to and from the said end-point is regulated by the policy enforcement agent application installed therein, based on the said end-point specific micro-segmentation oriented firewall rule/network security policy.

In this context, whenever the end-point device receives an incoming IP datagram or whenever an outgoing IP datagram is to be transmitted from the said end-point device, the policy enforcement agent application installed within the end-point device analyses the incoming IP datagram or the outgoing IP datagram, and consequentially identifies (at least) the 'source IP address', 'source port number', 'destination IP address' and 'destination port number' associated with the (incoming/outgoing) IP datagram. Subsequently, the policy enforcement agent application accesses the (relevant) micro-segmentation oriented firewall rules/network security policies received from the policy server 16—the relevance of micro-segmentation oriented firewall rules/network security policies to a particular end-point device determined based on the IP address assigned to the end-point; with the mention of the end-point's IP address within a micro-segmentation oriented firewall rule/network security policy-acting as a trigger for considering said firewall rule/network security policy as relevant and decides whether to allow the (incoming/outgoing) IP datagram or (incoming/outgoing) drop the IP datagram, based on said relevant firewall rules/network security policies.

As discussed earlier, on a broader perspective, the micro-segmentation oriented firewall rules/network security policies specify the 'source IP addresses' and 'source port numbers' from which incoming IP datagrams can be received, and the 'destination IP addresses' and 'destination port numbers' to which outgoing IP datagrams can be transmitted. Further, when considered from the perspective of a specific end-point device, a micro-segmentation oriented firewall rule/network security policy which addresses the (said) specific end-point device defines (specifies) the 'source IP addresses' and 'source port numbers' from which the end-point device could receive (incoming IP datagrams), and also the 'destination IP addresses' and 'destination port numbers' with which the said end-point device could communicate by the way of transmitting outgoing IP datagrams. Further, it is preferable that the micro-segmentation oriented firewall rules/network security policies while being stored on the policy database are segregated/clustered based on the specific end-point device to which each of the firewall rules/network security policies are related. In an exemplary embodiment of the present disclosure a Media Access Control (MAC) address associated with each of the end-point devices is used as a benchmark to segregate/cluster the firewall rules/network security policies as being relevant to individual end-point devices.

The computer implemented method, a corresponding computer implemented system and a computer program product envisaged by the present disclosure facilitate snooping of PCP packets—preferably either a PCP MAP RESPONSE packet or a PCP PEER RESPONSE packet—and consequentially learning from the snooped PCP packets the mapping between an internal IP address-internal port number pair (also referred to as source IP address-source port number pair) and a (corresponding) external IP address-external port number pair.

As discussed earlier, it is common for an IP datagram routed via one or more translators (12) to incorporate an external (translated) IP address and an external (translated) port number generated and assigned by the translator 12, instead of and as a substitution to the original source IP address and source port number (indicative of the origin of the said IP datagram). The replacement of the original source IP address and source port number with the external IP address and external port number renders a predefined network security policy or a firewall rule void since the network security policy/firewall rule would have been defined based on the original source IP address and source port number associated with the IP datagram. Further, it is almost impossible for the policy server 16 to second-guess the external IP address and external port number that would replace the original source IP address and source port number before creating the security policy/firewall rule, since such a substitution of the external IP address and external port number (and the consequential replacement of the original source IP address and source port number) always occurs in a dynamic manner at the translator 12.

However, the phenomenon of snooping on PCP packets as envisaged by the present disclosure provides for tracking the translation—preferably performed by a Network Address Translator device (NAT device)—of an internal IP address-internal port number pair assigned to an IP datagram into a corresponding external IP address-external port number pair. By snooping on the PCP packets being exchanged between the PCP client 10B and the PCP server 10C, the method provides for learning the mapping between the said internal IP address-internal port number pair and the corresponding external IP address-external port number pair, and (the method) further facilitates the use of the learnt mapping information (i.e., the translation of an internal IP address-internal port number pair into an external IP address-external port number pair) in dynamically reconfiguring the (micro-segmentation oriented) network security policies/firewall rules such that the said network security policies/firewall rules are reconfigured dynamically taking into consideration the replacement of the internal IP address-internal port number pair with the external IP address-external port number pair—thereby rendering the network security policies/firewall rules valid and usable in deducing an appropriate PACKET ALLOW/PACKET DROP decision even when the internal IP address and internal port number assigned to an (the) IP datagram are dynamically replaced with an external IP address-external port number pair.

By facilitating snooping of the PCP packets and consequentially facilitating learning of mapping information embedded within the said PCP packets, the computer implemented method and the corresponding computer implemented system and computer program product envisage anticipating the default behaviour of the Network Address Translation (NAT) device (referred to as translator 12 in FIG. 1), for example, a gateway—which is characterized by replacement of the internal IP address and the internal port number (source IP address and source port number) stored in the IP header of the IP datagram with an external IP address and external port number (translated IP address and translated port number) and facilitating trustful and non-repudiable verification of an internal IP address and internal port number assigned to the IP datagram and consequentially the trustful and non-repudiable verification of the origin endpoint of the IP datagram, by the way of snooping upon PCP packets and deriving the necessary mapping between the internal IP address-internal port number pair and external IP address-external port number pair therefrom, despite the internal IP address and internal port number stored within the IP header of the IP datagram being replaced by an external (translated) IP address and (translated) external port number, at the NAT device.

TECHNICAL ADVANTAGES

The technical advantages envisaged by the present disclosure include the realization of a computer implemented method, and a corresponding system and a computer program product that facilitate implementation of micro-segmentation across a computer network despite the presence of at least one Network Address Translator (NAT) device therein. The (computer-implemented) method, system and the computer product envisioned by the present disclosure configure a network security software (preferably resident on a host computer device) to snoop upon Port Control Protocol (PCP) packets emanating from a PCP client, so as to identify a mapping between an internal IP address and internal port number pair and a corresponding external IP address and external port number pair.

The present disclosure also envisages analyzing the NAT mapping information learnt by the way of snooping on a corresponding PCP packet (preferably, either a POP MAP response or a PCP PEER response), using the network security software program and triggering the network security software program to create network security policies relevant to and responsive to the mapping between the internal IP address/internal port number pair and the external IP address/external port number pair. Further, the present disclosure also envisages creating network security policies governing PACKET ACCEPT and PACKET DROP decisions, in a dynamic manner, and based on the mapping between the internal IP address/internal port number pair and the external IP address/external port number pair.

Further, the system architecture envisaged by the present disclosure does not necessitate the network security software to be always in-line with the flow path of the PCP packets, but requires the network security software to be present only on the same layer-2 broadcast domain, so as to be able to snoop upon the said PCP packets. Additionally, the present disclosure and the corresponding method, system and computer program product envisaged therein does not necessitate use of specialized Kernel Hook Modules (KHM) or sockets or hooks to tap onto the PCP packets. Further, the present disclosure, and the snooping mechanism envisaged therein does not trigger an increase in the overall size of the network packet as was the case with in-band transmission mechanisms for communicating the internal IP address and internal port number pair.

What is claimed is:

1. A computer-implemented method for learning Network Address Translation mapping information by snooping on Port Control Protocol (PCP) packets, said method comprising the following computer implemented steps:
   receiving, at a PCP server of a network, from a PCP client of a first device, a PCP MAP request comprising a query for Network Address Translation (NAT) mapping information associated with a network address translator of the network;
   determining, by said PCP server in response to said PCP MAP request, at least one NAT mapping entry associated with said network address translator, wherein said NAT mapping entry specifies a mapping between at least one internal IP address-internal port number pair, and a corresponding external IP address-external port number pair, said mapping corresponding to an IP datagram forward-transmitted by said network address translator;
   transmitting, by the PCP server, a PCP MAP response to the PCP client, said PCP MAP response incorporating said NAT mapping entry;
   snooping, by a snooping agent, said PCP MAP response and analyzing said NAT mapping entry incorporated therein;
   determining, by said snooping agent, said mapping between said internal IP address-internal port number pair and said corresponding external IP address-external port number pair, based on said NAT mapping entry; and
   transmitting, by said snooping agent, said mapping to a policy server, and triggering said policy server to dynamically formulate a plurality of micro-segmentation oriented network security policies executable at respective micro-segments of the network, based on said mapping between said internal IP address-internal port number pair and said corresponding external IP address-external port number pair, thereby rendering said micro-segmentation oriented network security policies valid and executable on said IP datagram, despite said internal IP address-internal port number pair corresponding to said IP datagram being replaced by said external IP address-external port number pair.

2. The method as claimed in claim 1, wherein the step of dynamically formulating said network security policies, further includes the steps of formulating at least one network security policy applicable to said first device, said network security policy formulated based on said NAT mapping entry learnt by way of snooping said PCP MAP response, and generating a packet drop/packet accept decision corresponding to said first device, based on said network security policy.

3. The method as claimed in claim 1, wherein the step of dynamically formulating a plurality of network security policies, further includes the step of formulating at least one network security policy responsive to said mapping between said internal IP address-internal port number pair and said corresponding external IP address-external port number pair.

4. A non-transitory computer program product having computer readable instructions stored thereupon, the computer readable instructions when executed by a computer processor coupled to aid a PCP server, cause the computer processor to:
  receive, from a PCP client of a first device of a network, a PCP MAP request comprising a query for Network Address Translation (NAT) information associated with a network address translator of the network;
  determine, in response to said PCP MAP request, at least one NAT mapping entry associated with said network address translator, wherein said NAT mapping entry specifies a mapping between at least one internal IP address-internal port number pair, and a corresponding external IP address-external port number pair, said mapping corresponding to an IP datagram forward transmitted by said network address translator;
  transmit a PCP MAP response to the PCP client, said PCP MAP response incorporating said NAT mapping entry;
  trigger a snooping agent to snoop on said PCP MAP response and further trigger said snooping agent to analyze said NAT mapping entry;
  trigger said snooping agent to determine said mapping between said internal IP address and internal port number and said corresponding external IP address and external port number, based on said NAT mapping entry; and
  receive said mapping from said snooping agent, and dynamically formulate a plurality of micro-segmentation oriented network security policies executable at respective micro-segments of the network, based on said mapping between said internal IP address-internal port number pair and said corresponding external IP address-external port number pair, thereby rendering said micro-segmentation oriented network security policies valid and executable on said IP datagram, despite said internal IP address-internal port number pair corresponding to said IP datagram being replaced by said external IP address-external port number pair.

5. The computer program product as claimed in claim 4, wherein the computer readable instructions, when executed by the processor, further cause the processor to formulate at least one network security policy applicable to said first device, said network security policy formulated based on said NAT mapping entry learnt by way of snooping said PCP MAP response, and generate a packet drop/packet accept decision corresponding to said first device, based on said network security policy.

6. The computer program product as claimed in claim 5, wherein the computer readable instructions, when executed by the processor, further cause the processor to formulate at least one network security policy responsive to said mapping between said internal IP address-internal port number pair and said corresponding external IP address-external port number pair.

7. A computer implemented system for learning Network Address Translation mapping information by snooping on Port Control Protocol (PCP) packets, said system comprising:
  a PCP server communicably coupled to a PCP client via a network, said PCP server and PCP client situated on a same layer-2 broadcast domain, said PCP server configured to:
  receive a PCP MAP request comprising a query for Network Address Translation (NAT) information associated with a Network Address Translator of the network;
  determine, in response to said PCP MAP request, at least one NAT mapping entry associated with said network address translator, wherein said NAT mapping entry specifies a mapping between at least one internal IP address-internal port number pair, and a corresponding external IP address-external port number pair, said mapping corresponding to an IP datagram forward transmitted by said network address translator;
  transmit a PCP MAP response to the PCP client, said PCP MAP response incorporating said NAT mapping entry;
  a snooping agent located on said layer-2 broadcast domain incorporating said PCP server and said PCP client, said snooping agent configured to snoop said PCP MAP response and analyze said NAT mapping entry incorporated therein, said snooping agent further configured to determine said mapping between said internal IP address-internal port number pair and said corresponding external IP address-external port number pair, based on said NAT mapping entry; and
  a policy server communicably coupled to said snooping agent, said policy server configured to receive said mapping from said snooping agent, said policy server further configured to dynamically formulate a plurality of micro-segmentation oriented network security policies executable at respective micro-segments of the network, based on said mapping between said internal IP address-internal port number pair and said corresponding external IP address-external port number pair, said policy server further configured to render said micro-segmentation oriented network security policies valid and executable on said IP datagram, despite said internal IP address-internal port number pair corresponding to said IP datagram being replaced by said external IP address-external port number pair.

* * * * *